Patented Sept. 29, 1953

UNITED STATES PATENT OFFICE 2,653,914

METHOD OF RECLAIMING SCRAP VULCANIZED MATERIAL USING AN OLEFIN AS RECLAIMING AGENT

Joseph Clifton Elgin, Princeton, N. J., and Edward F. Sverdrup, Buffalo, N. Y., assignors to U. S. Rubber Reclaiming Co., Inc., Buffalo, N. Y.

No Drawing. Original application November 2, 1950, Serial No. 193,688. Divided and this application September 12, 1951, Serial No. 246,327

6 Claims. (Cl. 260—2.3)

This invention relates to the reclaiming of vulcanized elastomeric material.

This application is a division of our copending application Serial No. 193,688, filed November 2, 1950.

Numerous improvements in the reclaiming of rubber have been made in recent years. The use of oxido-plasticization agents and other chemical plasticization agents as proposed by ourselves and others has made possible the production of improved reclaims in a simpler and more effective manner. We have shown, moreover, that by carrying out reclaiming processes at temperature ranges of from 300–325° F. to 475–500° F. similar improvements in both process and product may be obtained. We have shown further that even greater improvements may be obtained by the mechanical working of the rubber under conditions wherein temperatures within such ranges are generated by the working.

We have now found, however, that by the use of certain agents in processes involving heat-generating mechanical working we can obtain good results.

One class of such agents are chemically active unsaturated compounds.

Examples of unsaturated compounds which may be employed pursuant to the present invention are normal and iso hexenes, heptenes, and octenes.

Particularly effective results are obtained by the use of apparatus as shown and described in our said application Serial No. 193,688, filed November 2, 1950.

Altho there are described below a preferred embodiment of our invention and various alternatives and modifications thereof, it is to be understood that these are not intended to be exhaustive nor limiting of the invention, but, on the contrary, are given with a view to illustrating and explaining the principles of the invention and their embodiment for practical use, in order that others skilled in the art may be enabled to adapt and modify them in numerous embodiments and modifications, each as may be best adapted to the conditions of any particular use.

The transit time may be up to 3.7 minutes or more, the flow being 50 pounds per hour $$\left(\frac{3.1}{3.7} \times 60\right)$$

where 3.1 is the conversion factor from time in minutes to pounds per minute for the particular machine referred to below).

Example 100 parts of tire peels (50% natural and 50% Buna S) defiberized and ground to 24-mesh size were thoroughly mixed with 1.0 part of a mixture of iso-hexenes, iso-heptenes and iso-octenes, 1.5 parts of petroleum solvent, 5.0 parts of petroleum asphalt, and 3.67 parts of petroleum resin. The resulting mixture was passed through a 3-inch worm extruder such as described in our applications 209,287 and 364,101. The transit time was 2.6 minutes. Jacket temperature was about 281° F. and the recorded temperature in the machine was 321° F. The resulting reclaim had a specific gravity of 1.134 and a Williams plasticity number of 4.38. When tested in the Reclaimers Association Formula based on 50% hydrocarbon content, the following results were obtained:

| Cure at 287° F. | Tensile, lbs. per sq. in. | Elongation, percent | Hardness |
|---|---|---|---|
| 25 minutes | 780 | 313 | 42 |
| 30 minutes | 769 | 300 | 44 |
| 35 minutes | 788 | 293 | 45 |

We claim:

1. The process of reclaiming scrap vulcanized material which comprises mechanically working the scrap under compacting pressure to generate heat sufficient to raise the temperature to over about 325° F. as it moves forward progressively at a rate of not less than about 50 pounds per hour in the presence of an unsaturated hydrocarbon of the class consisting of hexenes, heptenes, and octenes.

2. A method as set forth in claim 1 wherein the hydrocarbon is an iso compound.

3. A method as set forth in claim 1 wherein the hydrocarbon is a normal compound.

4. A method as set forth in claim 1 wherein the hydrocarbon is hexene.

5. A method as set forth in claim 1 wherein the hydrocarbon is heptene.

6. A method as set forth in claim 1 wherein the hydrocarbon is octene.

JOSEPH CLIFTON ELGIN.
EDWARD F. SVERDRUP.

References Cited in the file of this patent

UNITED STATES PATENTS

| Number | Name | Date |
|---|---|---|
| 2,324,980 | Kilbourne | July 20, 1943 |
| 2,343,558 | Kirby | Mar. 7, 1944 |
| 2,415,449 | Sverdrup | Feb. 11, 1947 |
| 2,447,732 | Campbell | Aug. 24, 1948 |
| 2,461,192 | Banbury | Feb. 8, 1949 |
| 2,494,593 | Sverdrup | Jan. 17, 1950 |

FOREIGN PATENTS

| Number | Country | Date |
|---|---|---|
| 610,901 | Great Britain | Oct. 21, 1948 |
| 968,592 | France | Apr. 26, 1950 |